UNITED STATES PATENT OFFICE.

OSCAR OTTOE STONE, OF SAN ANTONIO, TEXAS.

PLASTIC COMPOSITION.

1,196,610. Specification of Letters Patent. Patented Aug. 29, 1916.

No Drawing. Application filed June 21, 1916. Serial No. 104,967.

*To all whom it may concern:*

Be it known that I, OSCAR O. STONE, a citizen of the United States, and a resident of San Antonio, in the county of Bexar and State of Texas, have invented a certain new and useful Improvement in Plastic Composition, of which the following is a specification.

My invention relates to improvements in plastic compositions, more especially in compositions for making coffins or caskets, and it consists in the various ingredients hereinafter specified.

An object of my invention is to provide a plastic composition which will last indefinitely.

A further object of my invention is to provide a composition of matter which will resist water and air, and which will not crack or crumble.

A further object of my invention is to provide a composition of matter which will harden and which will take a polish.

Other objects and advantages will appear in the following specification, and the novel features of the invention will be particularly pointed out in the appended claim.

In carrying out my invention, I grind oyster shells to a fine powder which is then bolted through cloth like flour. Two parts of the oyster-shell dust or powder is now mixed with one part of plaster of Paris, the two powders being thoroughly incorporated. One part of beeswax is now melted in a separate vessel and brought to a boil over a slow fire. The mixture of oyster-shell powder and plaster of Paris is now stirred into the boiling beeswax until the mixture is about the consistency of thick molasses. A mold is ready at hand and the hot mixture is poured into the mold and allowed to cool. If it is desired, coloring matter may be added while the mixture is in a plastic state.

A coffin or casket made of this plastic material is water-proof and will take a high polish. The polished material looks like marble, but is relatively cheap.

A coffin made as described is comparatively light and yet has considerable strength, and as stated above, will last indefinitely.

I claim:—

The herein described plastic composition, which consists of two parts of ground oyster shells, one part of plaster of Paris, and one part of beeswax.

OSCAR OTTOE STONE.

Witnesses:
OLLIE M. ROBINSON,
SAMUEL HANNA,
MARK E. ROBINSON.

Copies of this patent may be obtained for five cents each, by addressing the "Commissioner of Patents, Washington, D. C."